Nov. 15, 1932.　　　　R. S. BROWN　　　　1,887,621
CHUCKING MECHANISM
Original Filed May 10, 1928　　3 Sheets-Sheet 1
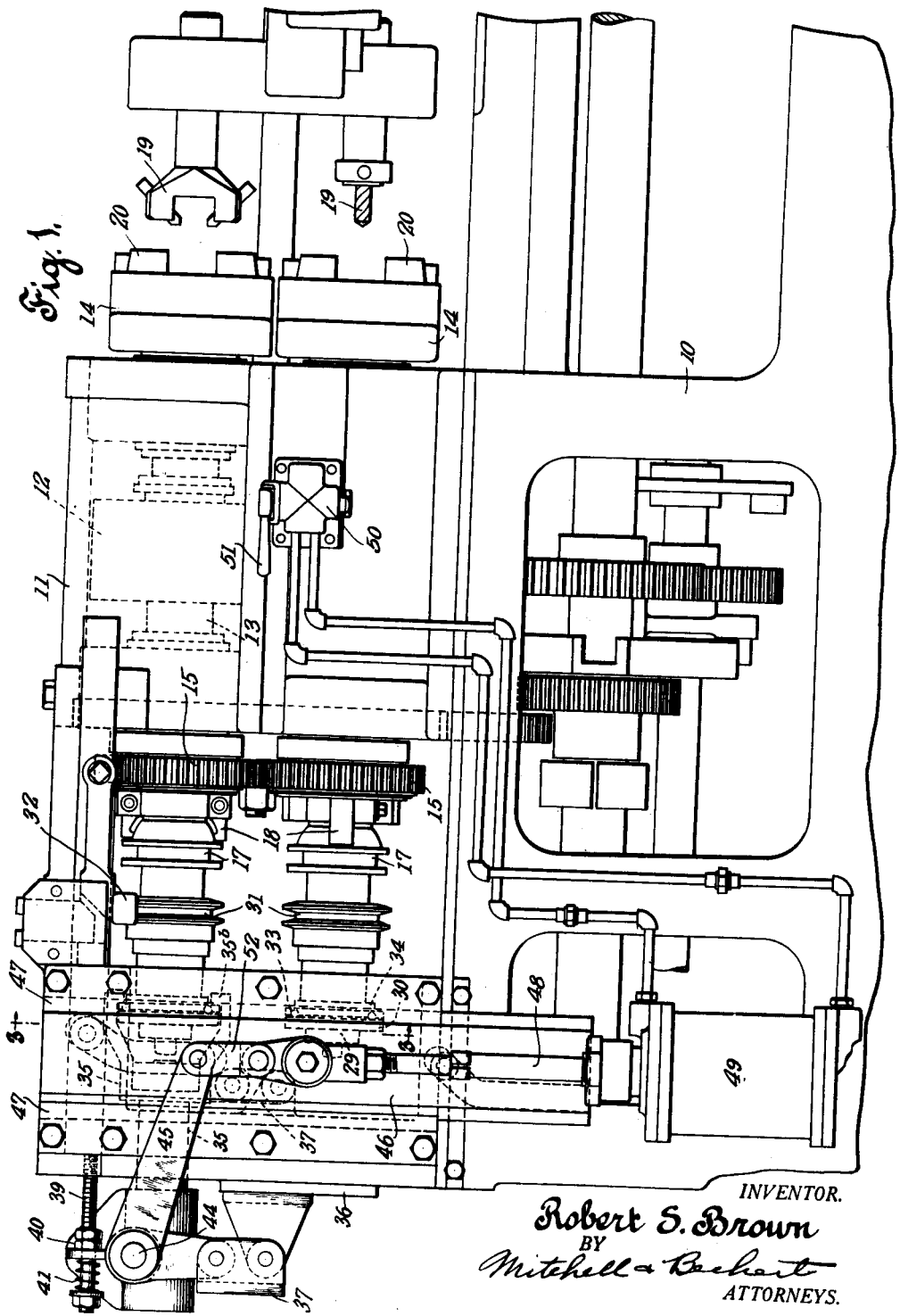

Nov. 15, 1932.  R. S. BROWN  1,887,621
CHUCKING MECHANISM
Original Filed May 10, 1928  3 Sheets-Sheet 2
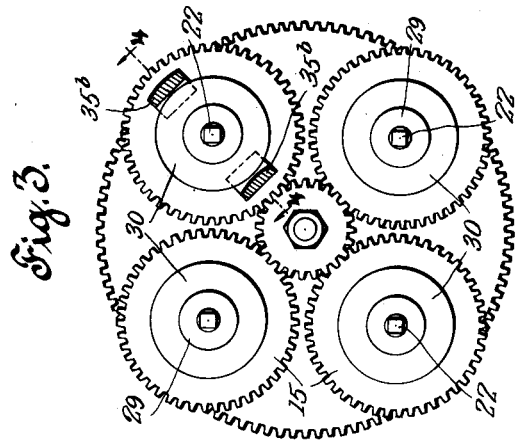
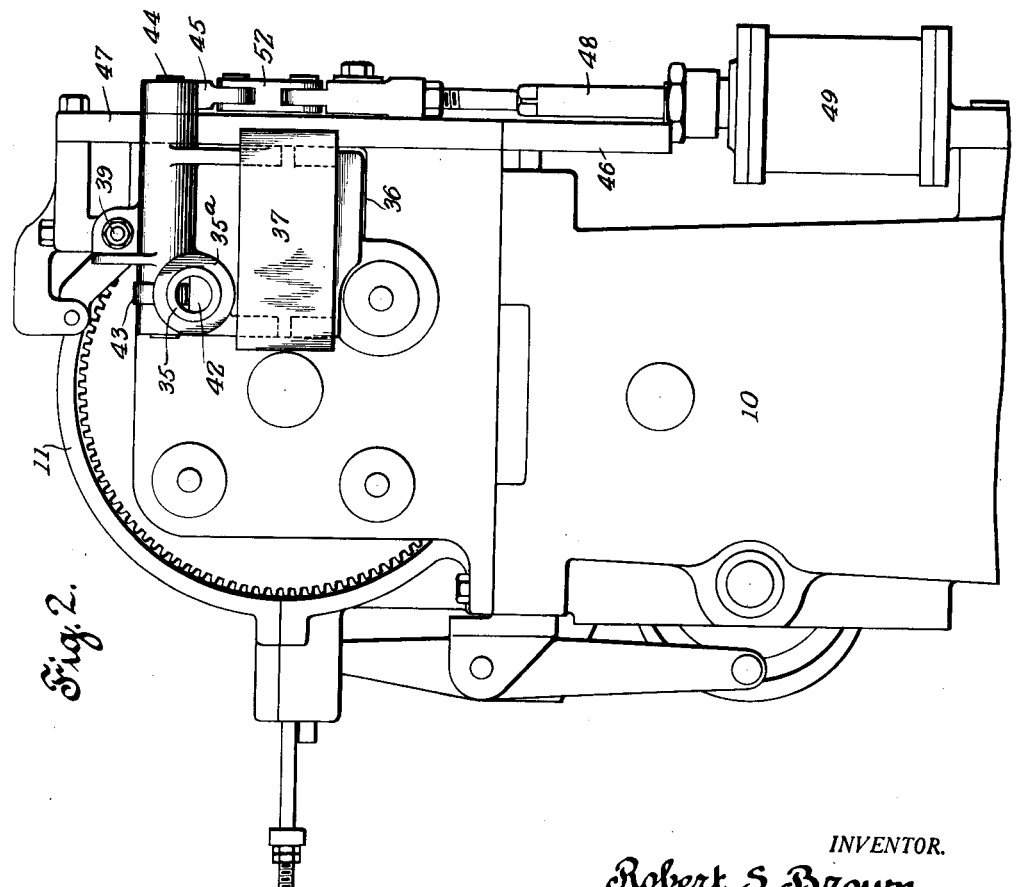
INVENTOR.
Robert S. Brown
BY
Mitchell & Bechert
ATTORNEYS.

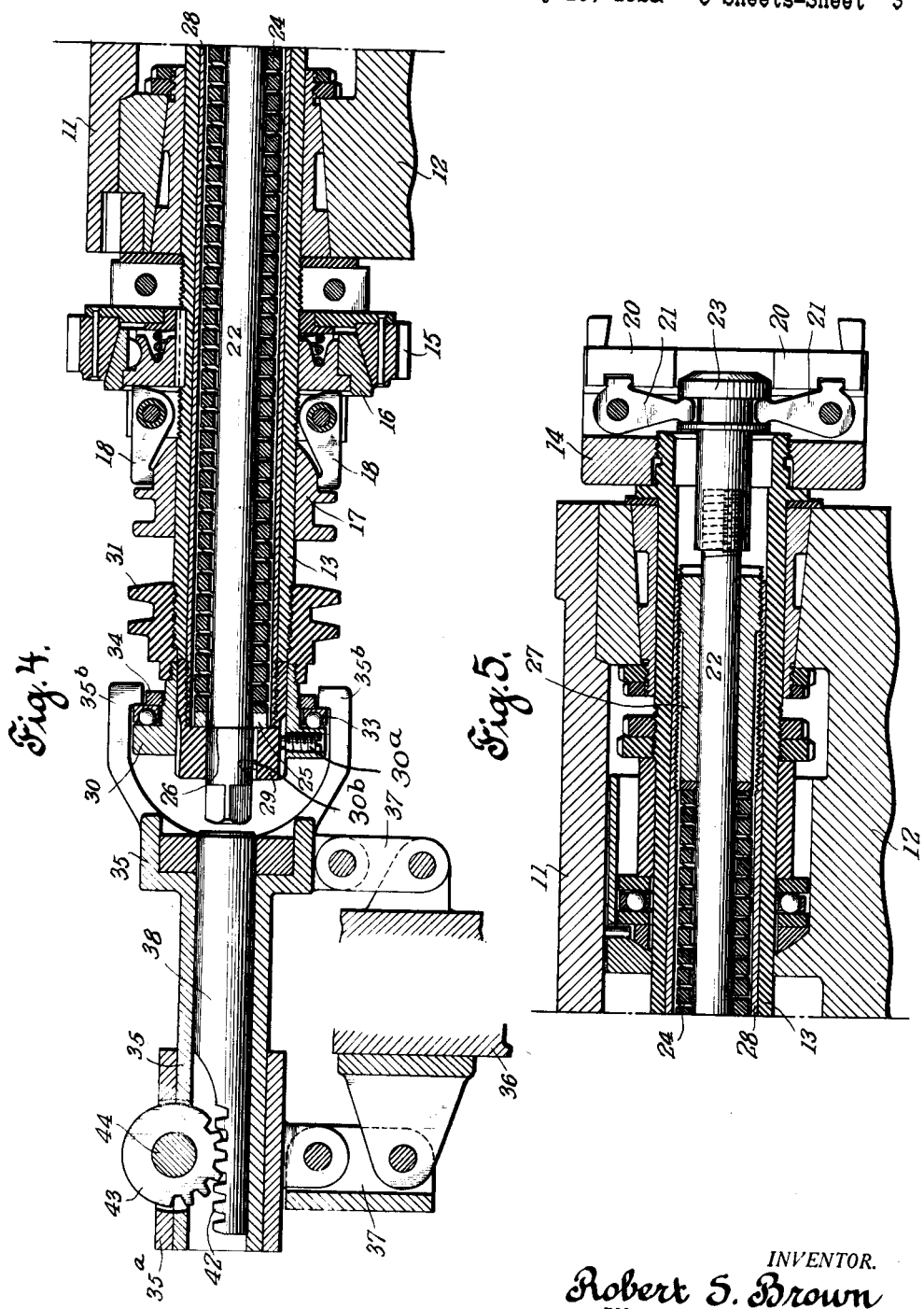

Patented Nov. 15, 1932

1,887,621

UNITED STATES PATENT OFFICE

ROBERT S. BROWN, OF NEW BRITAIN, CONNECTICUT, ASSIGNOR, BY MESNE ASSIGNMENTS, TO THE NEW BRITAIN-GRIDLEY MACHINE COMPANY, OF NEW BRITAIN, CONNECTICUT, A CORPORATION OF CONNECTICUT

CHUCKING MECHANISM

Application filed May 10, 1928, Serial No. 276,590. Renewed March 3, 1932.

This invention relates to chucking mechanism and particularly, though not exclusively, to such mechanism for a metal cutting machine having a plurality of work and tool holders, either the work or tool holders being indexable to different operative positions.

An object of the present invention is to provide an improved actuating mechanism for a work clamping chuck.

It is another object to improve certain features of a chucking mechanism to facilitate assembly and operation of the mechanism.

Another and more specific object of the present invention is to provide chuck actuating mechanism which will permit individual operation of each chuck in a series of the chucks and prevent any strain being placed upon another chuck or upon the carrier on which the chucks are supported during opening or closing of a chuck, all strains set up by the operation of a chuck being confined within and limited to the parts operating with and connected to the chuck being operated.

Another object of the invention is to provide chuck opening means, one member of which engages over a collar or abutment formed on the end of the spindle or other member carrying the chuck and the other member engages against a chuck operating rod, the two members being relatively movable to force the rod in one direction.

One feature of importance is that the first member of the chuck opening means is supported upon the machine base so that it may float slightly relative to the base or supporting member for the spindle and be retained normally in position to engage over the abutment on the spindle. The other member is actuated relatively to this floating member, thus restricting all strains set up by operation of the chuck operating means to the two relatively movable members and the parts carried by and operating with the chuck.

With these and other objects in view, my invention consists in the features of construction and operation set forth in the following specification and illustrated in the accompanying drawings.

In the accompanying drawings annexed hereto and forming a part of this specification I have shown my invention embodied in a multiple spindle chucking machine having a plurality of work spindles, each rotatable within an indexing carrier, but it will be understood that the invention can be otherwise embodied, and that the drawings are not to be construed as defining or limiting the scope of the invention, the claims appended to this specification being relied upon for that purpose.

In the drawings—

Fig. 1 is a front elevation of a machine in which an embodiment of the present invention has been incorporated, parts being shown fragmentarily;

Fig. 2 is an end elevation of the machine taken from the left hand end of Fig. 1;

Fig. 3 is a fragmentary end view showing the spindle rotating means taken upon the line 3—3 of Fig. 1;

Fig. 4 is a longitudinal sectional view of the driving and chuck operating end of a spindle taken upon the plane of the line 4—4 in Fig. 3; and Fig. 5 is a similar view of the opposite end of the chuck carrying spindle showing the work engaging chuck.

In the above mentioned drawings I have shown but one embodiment of the invention which is now deemed preferable, but it is to be understood that changes and modifications may be made within the scope of the appended claims without departing from the spirit of the invention.

Briefly stated, in the preferred form the invention includes a chuck carrying member, such as a spindle with a chuck thereon. The chuck jaws are preferably actuated in the jaw closing direction by spring means. The chuck jaws are opened against the force of the spring means by suitable mechanism engaging the spindle, or other chuck carrying means, and a chuck opening member so that the strains incident to opening the chuck are confined to the chuck and the means directly carrying the same.

Referring more in detail to the figures of the drawings, I show a machine base or bed 10 having a head 11 mounted on one end thereof. Within this head 11 is mounted a carrier or turret 12 adapted to be indexed by rotation to a plurality of different positions. As this indexing mechanism for the turret 12 and the turret itself are, or may be, of any well known or standard type, it is not thought necessary to describe it. If desired, this mechanism may correspond with that shown in my Patent, 1,311,314 dated July 29, 1919.

Mounted in this carrier or turret 12 are a plurality of spindles 13 parallel to and equidistant from the axis of rotation of the carrier 12. On one end of each of these spindles 13 is mounted a work clamping chuck of any preferred form or type, such as the sliding jaw type chuck 14 adapted to be actuated by mechanism presently to be described. Preferably the spindles 13 are adapted for rotation and are for that reason provided with driving means in the form of a gear 15 adapted to be clutched to its spindle 13 by a friction clutch 16. A spool 17 movable axially on the spindle 13 acting through levers 18 provide means for engaging and disengaging this clutch 16. It will be understood that tools 19 shown fragmentarily in Fig. 1 are adapted to operate upon work blanks mounted in the chucks 14 which may be threaded on these spindles 13. Preferably these tools 19 may simultaneously operate upon work pieces in the different chucks 14. One of these spindles 13 however is idle at each indexed position of the carrier or turret 12 to permit removal of completed work and placing a blank in position for operation.

Referring to Figs. 4 and 5, and particularly to Fig. 5, it will be seen that the chuck 14 on each spindle 13 is provided with radially movable jaws 20 moved in opposite directions to engage or release a work blank by oscillation of bell-cranks 21 within the chucks 14 which are actuated by a rod 22 extending longitudinally within the spindle 13 to which the chuck 14 is attached. As shown in Fig. 5 the chuck actuating rod 22 is threaded to a member 23 within the chuck 14 engaging the inner ends of the bell-cranks 21. A strong helical spring 24 also mounted within the spindle 13 and surrounding the chuck operating rod 22, normally forces the rod 22 in one direction, this direction of movement of the rod serving preferably to close the chuck jaws 20, and thus firmly clamp work pieces therein. This spring 24 at one end bears against a washer 25 within the spindle 13 held against a shoulder 26 formed on the rod 22. The opposite end of the spring 24 bears against a member 27 adjustably threaded within a sleeve 28 within the spindle 13. The sleeve 28 is held in fixed position within the spindle 13 by being threaded at its outer end to a collar 29 abutting against the end of the spindle 13, the collar 29 being suitably retained in that position by suitable securing means such as a screw 30ª in the collar 30 held on the spindle. The force of the compressed spring 24, therefore, normally tends to move the chuck operating rod 22 in a direction to close the work engaging jaws 20 thereon.

In order to force the rod 22 in the direction against the force of the helical spring 24 an abutment or collar 30 is threaded or otherwise secured upon the end of the spindle 13. In the form shown in Fig. 4 this abutment or collar 30 is threadedly engaged with the grooved collar 31 directly threaded upon the spindle 13. This grooved collar 31 is adapted to be engaged by a brake member 32 to stop rotation of the spindle 13. Associated with the abutment 30 is an antifriction thrust bearing 33 held in place adjacent the abutment by a ring 34. A sleeve member 35 is supported upon an extension 36 from the base 10 and independently of the turret 12 in a manner to permit limited longitudinal movement. This member has a yoke at one end consisting of two arms 35ᵇ which are adapted to engage over abutment 30 and bearing 33 when a spindle 13 is in the proper indexed position for removal and replacement of a work blank. A housing 35ª is rigidly attached to the other end of the sleeve 35. In order to flexibly support the sleeve member 35 in alignment with one of the spindles 13 links 37 are provided of equal length. These links 37 at their lower ends are pivotally attached to the extension 36 and at their upper ends are pivotally attached to the sleeve member 35 and housing 35ª. This sleeve member 35 is therefore free to move axially and remain substantially in alignment with one of the spindles 13. A plunger 38 is slidably mounted in the sleeve 35 and is adapted to contact against the extended end of the chuck actuating rod 22. Movement of this plunger 38 to the right as viewed in Fig. 4 forces the rod 22 toward the right while the sleeve member 35 is held in position to engage over the collar or abutment 30 on the spindle 13.

The supporting means 37 for the sleeve member 35 permits limited movement of this member and normally holds it so that the arms 35ᵇ will engage over the abutment 30 and bearing 33 on the spindle 13 when the carrier 12 is indexed. To retain the member 35 in proper position to assure engagement of the arms 35ᵇ over the abutment 30 a threaded rod 39 is secured in the machine base extension 36 having adjustable nuts 40 thereon. A spring 41 on this rod 39 forces a flange on the housing 35ᵃ against the nuts 40. The spring 41 is made of light wire and permits movement of the housing 35ᵃ readily toward the left in effecting operation of the plunger 38 to open the chuck jaws 20.

In order to force the plunger 38 within the sleeve 35 to engage the rod 22 and open the chuck jaws 20, its outer end is cut away and formed with rack teeth 42 adapted to engage gear teeth of a pinion 43 keyed or otherwise secured to a transverse shaft 44 rotatable within and carried by the housing 35ᵃ. At one end of this transverse shaft 44 is a lever 45, movement of which will effect limited rotation of the pinion 43 and thus movement of the plunger 38 within the sleeve 35. To effect movement of this lever 45 a vertical plate 46 is provided similar to that shown in the above referred to patent. This plate 46 is movable within fixed guide strips 47 suitably secured to the head extension 36. Movement of this plate 46 may be effected by vertical movement of a piston and piston rod 48 operating within a cylinder 49 by compressed air or other means. To move this piston rod 48 and plate 46, a manually operated valve 50 of the three-way type is provided, which may be operated by a suitable handle 51, the valve 50 and handle 51 being mounted in a convenient position adjacent the chucks 14. As this part of the mechanism is, or may be similar to that shown in my above patent, further discussion is not thought to be necessary.

Movement upward of the plate 46 oscillates the lever 45 attached thereto by an intermediate link 52 and rotates the pinion 43 to advance the plunger 38 within the sleeve and yoke member 35 to abut against the end of the rod 22. Continued upward movement of the plate 46 moves the sleeve 35 toward the left until the arms 35ᵇ take up against the abutment 30 on the spindle 13. Still further upward movement of the plate continues the movement of the plunger 38 to force the rod 22 against the spring 24 to open the chuck jaws 20. The arms 35ᵇ on member 35 are disposed so that the turret or spindle carrier 12 can index, the end of the spindle 13 passing between the arms 35ᵇ. In each indexed position of the turret 12 one of the spindles 13 is revolved to a position aligned with the plunger 38.

In operation, and with the turret 12 in an indexed position the arms 35ᵇ of the member 35 engage over the abutment 30 of one of the spindles 13. By operating the valve 50 the piston rod 48 and plate 46 are elevated and the pinion 43 rotated by movement of the arm 45. This rotation of the pinion 43 first forces the plunger 38 against the end of rod 22 and also forces the arms 35ᵇ against the abutment 30. Further movement of the plunger 38 moves the rod 22 in a direction to operate the jaws 20. After a work piece has been removed from the chuck 14 and another inserted, valve 50 is operated in the reverse direction to force the piston rod 48 and plate 46 downward. This movement of the plate and consequent movement of the arm 45 retracts the plunger 38 so that rod 22 is returned to its initial position by spring 24. This movement of rod 22 returns the jaws 20 to their initial position and releases the sleeve 35 from the abutment 30. The turret 12 is then again ready for its next indexing movement.

During operation of the chuck opening means above described all axial stresses are balanced, that is, are confined to the spindle 13, the rod 22, the abutment 30 on the rod 22 and the actuating members 35 and 38 for the rod 22. The initial actuating force applied to the lever 45 is, in the form shown, in a direction transverse to the spindles and consequently puts substantially no axial strains on the spindles. Operation of the rod 22 by movement of the plunger 38 within member 35 places no strain upon the part such as the turret 12 within which the spindle 13 is mounted. If, therefore, a chuck 14 is operated while operations are being performed on work pieces in other spindles these work pieces will not be displaced in any way by any axial movement of the turret. Work being performed in these other spindles therefore will not be marred by irregular tool marks or defaced due to chucks on other spindles being opened and closed during cutting operations.

The mechanism forming the improved chuck operating means is primarily useful for the above reason upon machines having a plurality of work spindles, it may, however, be used to advantage upon machines having a single work spindle.

The spring chucking device illustrated is arranged to facilitate assembly and adjustments. The spring 24 may be pre-stressed and assembled in such pre-stressed condition with the chuck parts. It will be clear that after loosening the screw 30ᵃ the rod 22 may be turned and due to its splined connection 30ᵇ with the collar 29, the latter and the tube 28 will be turned with the rod until the rod is unscrewed from the chuck part 23. Thereafter the tube 28, together with the collar 29, spring 24, threaded plug 27, and rod 22 may be withdrawn from the spindle and the spring will remain under tension. Adjustment of the normal stress upon the spring 24 is effected by means of the adjustable plug 27. The assembly of the spring parts with the spindle is effected in the reverse order of disassembly described.

It will be manifest that the spring chucking parts may be readily assembled and the spring tensioned on the bench where proper tools may be used and all of the parts may then be assembled as a unit with the spindle as heretofore indicated.

I claim:

1. In a chuck operating mechanism, a chuck carrier, a chuck mounted thereon, a chuck operating rod extending through said chuck carrier, a spring normally forcing said rod in one direction, and relatively movable members adapted to engage respectively said chuck carrier and said rod for forcing said rod in an opposite direction against said spring.

2. In a chuck operating mechanism, a chuck carrier, a chuck mounted thereon, a chuck operating rod extending through said chuck carrier, a spring normally forcing said rod in a direction to effect closing of said chuck, and relatively movable members adapted to engage respectively said chuck and said rod for forcing said rod in an opposite direction against said spring to open said chuck.

3. In a chuck operating mechanism, a chuck carrier, a chuck mounted thereon, a chuck operating rod extending through said chuck carrier, a spring normally forcing said rod in one direction, a member adapted to engage said chuck and mounted independently of said carrier, a second member adapted to engage and force said rod in an opposite direction against said spring, and means to move said second member relative to said first member.

4. In a chuck operating mechanism, a chuck carrier, means to index said chuck carrier, a plurality of chucks on said carrier, chuck operating rods extending through said chuck carrier, individual springs for said chucks normally forcing said rods in one direction, and relatively movable means adapted to engage respectively a chuck in each indexed position of said carrier and mounted independently of said carrier for forcing a rod in an opposite direction against said spring.

5. In a chuck operating mechanism, a chuck carrier, means to index said chuck carrier, a plurality of chucks on said carrier, abutments on said chucks, chuck operating rods extending through said chuck carrier, individual springs for said chucks normally forcing said rods in a direction to effect closing of said chucks, a member adapted to engage the abutment secured to a chuck in each indexed position of said carrier and movable relatively to said carrier, and a second member movable relatively to said first member for forcing a rod in an opposite direction against its spring.

6. In a chuck operating mechanism, a chuck carrier, means to index said chuck carrier, a plurality of chucks on said carrier, abutments on said chucks, chuck operating rods extending through said chuck carrier, individual springs for said chucks normally forcing said rods in one direction, a yoke member adapted to engage the abutment attached to a chuck in each indexed position of said carrier and movable relatively to said carrier, and a plunger movable relative to said member for forcing a rod in the opposite direction against said spring.

7. A machine comprising in combination, a base, a chuck carrier thereon, a chuck mounted in said carrier, a chuck operating rod extending through said carrier, a spring normally forcing said rod in one direction, means movably mounted on said base and adapted to engage said chuck, and a member on said means and movable relative thereto for forcing said rod in a direction against said spring.

8. A machine comprising in combination, a base, a chuck carrier thereon, a chuck mounted in said carrier, a chuck operating rod extending through said carrier, a spring normally forcing said rod in one direction, means movably mounted on said base independent of said carrier and adapted to engage said chuck, a member on said means movable axially for forcing said rod in a direction against said spring, and a lever for effecting movement of said member relative to said means.

9. A machine comprising in combination, a base, a chuck carrier thereon, a plurality of chucks mounted in said carrier, individual chuck operating rods extending through said carrier, individual springs normally forcing said rods in one direction, means movably mounted on said base and adapted to be connected successively to said chucks, and a member on said means movable relative thereto for individually forcing said rods in a direction against their springs.

10. A chuck operating mechanism comprising in combination, a base, a spindle carrier therein, a rotatable spindle within said carrier, a chuck operating rod extending through said spindle, a spring normally forcing said rod in one direction, a collar having a flange thereon secured to said spindle, a sleeve member mounted on the base adjacent said spindle movable axially a limited distance relative to said carrier, said sleeve being connected to said spindle over said flange, a plunger movable within said sleeve member, and means to relatively move said sleeve member and plunger to force said rod against the pressure of said spring.

11. A chuck operating mechanism comprising in combination, a base, a spindle carrier therein, a rotatable spindle within said carrier, a chuck operating rod extending through said spindle, a spring normally forcing said rod in one direction, a collar having a flange thereon secured to said spindle, a sleeve member mounted on the base adjacent said spindle movable axially a limited distance, means to hold said sleeve member to engage over said flange, a plunger movable within said sleeve member, and means to relatively move said sleeve member and plunger to force said rod against the pressure of said spring.

12. A chuck operating mechanism comprising in combination, a base, a spindle carrier therein, means to index said carrier, a plurality of rotatable spindles within said support, chuck operating rods extending through said spindles, springs normally forcing said rods in one direction, a collar having a flange thereon secured to each of said spindles, a sleeve member mounted on the base adjacent said spindle movable axially a limited distance and engaging over a flange on a spindle in each indexed position of said carrier, a plunger movable within said sleeve member, and means to relatively move said sleeve member and plunger to force one of said rods against the pressure of its spring.

13. A chuck operating mechanism comprising in combination, a base, a spindle supported therein, rotating means for said spindle, a chuck operating rod within said spindle and normally forced in one direction, a flange on said spindle, a sleeve mounted in said base adjacent the end of said spindle and movable axially, members on said sleeve engaging over said flange, a plunger within said sleeve, and means to move said plunger relatively to said sleeve while said sleeve is movable axially to force said rod against the pressure of said spring.

14. A machine comprising in combination, a base, an indexing spindle carrier therein, a plurality of spindles rotatable therein, rotating means for said spindles, a chuck on each spindle, chuck operating rods extending through said spindles, springs forcing said rods in one direction, means including two relatively movable members mounted adjacent the carrier and supported for limited movement on said base, said members respectively engaging a spindle and rod in each indexed position of the carrier, and means to relatively move said members to force said rod in a direction against said spring.

15. A machine comprising in combination, a base, an indexing spindle carrier therein, a plurality of spindles rotatable therein, rotating means for said spindles, a chuck on each spindle, chuck operating rods extending through said spindles, springs forcing said rods individually in one direction, means including two relatively movable members mounted adjacent the carrier and supported for limited movement relative to said carrier, said members engaging respectively a spindle and rod in each indexed position of the carrier, and means to relatively move said members to force said rod in a direction against said spring.

16. A machine comprising in combination, a base, an indexing spindle carrier therein, a plurality of spindles rotatable therein, rotating means for said spindles, a clutch engaging and disengaging said rotating means, a chuck on each spindle, individual chuck operating rods extending through said spindles, springs forcing said rods in one direction, means including two relatively movable members mounted adjacent the carrier and independently supported on said base for limited movement relative to said carrier, said members respectively engaging a spindle and rod in each indexed position of the carrier, means to relatively move said members to force a rod relative to its spindle against said spring, and means to actuate said clutch.

17. A machine comprising in combination, a base, an indexing spindle carrier therein, a plurality of spindles rotatable therein, rotating means for said spindles, a chuck on each spindle, chuck operating rods extending through said spindles, springs forcing said rods individually in one direction, means mounted adjacent the carrier and supported by said base having members engaging respectively a spindle and rod in each indexed position of the carrier and permitting indexing movement of said carrier, and means to relatively move said members in indexed position of the carrier to force said rod in a direction against said spring.

18. A machine comprising in combination, a base, an indexing spindle carrier therein, a plurality of spindles rotatable therein, rotating means for said spindles, a chuck on each spindle, chuck operating rods extending through said spindles, springs forcing said rods individually in one direction, means mounted in a direction parallel to the axis about which said carrier is indexed adjacent the carrier and supported by said base having members engaging respectively a spindle and rod in each indexed position of the carrier and adapted to be disengaged from said spindle during indexing of said carrier whereby indexing movement is permitted, and means to relatively move said members to force said rod in a direction against said spring.

19. In an indexing multiple spindle machine, a plurality of spindles having chucks thereon, chuck actuating means therefor comprising two relatively movable members aligned with a spindle and its chuck actuating means in each indexed position of said machine and periodically associated with a spindle and relatively movable along the axis of said spindle to operate a chuck thereon.

20. In an indexing multiple spindle machine, a plurality of spindles having chucks thereon, chuck actuating means comprising two movable members aligned with a spindle in each indexed position of said spindle and mounted independently of said spindles and parallelly therewith, said actuating means having its members periodically associated respectively with a spindle and its chuck actuating means and relatively movable along the axis of said spindle to operate a chuck.

21. In a multiple spindle machine, a base, a turret thereon adapted to be indexed, spindles mounted in said turret having chucks thereon, and chuck actuating means comprising two movable members mounted independently of said turret, said actuating means being periodically associated with a spindle in each indexed position of said turret and acting in opposite directions along an axis coaxial with a spindle to operate a chuck.

22. In a machine having a plurality of chucks, a base, a turret thereon adapted to be indexed, chucks mounted in said turret and having operating means therefor extending through said turret, and chuck actuating means comprising two movable members mounted independently of said turret, said actuating means being periodically associated with one of said chuck operating means in each indexed position of said turret and acting in opposite directions along an axis coaxial with a chuck to operate the chuck.

23. In a chuck actuating mechanism, a chuck, an actuating member for said chuck, means for operating said actuating member including a part acting on said actuating member in a direction axially of said chuck, means connected to said chuck and resisting the force of said part for moving said chuck actuating member, and means for applying a primary moving force transversely of said chuck for moving said chuck actuating mechanism whereby all forces axially of said chuck are substantially balanced.

24. In a chuck actuating mechanism, a chuck, an actuator movable axially of said chuck for actuating the latter, means for applying a force to said actuator in a direction axially of said chuck, means engaging a part immovable axially of said chuck for resisting the force for moving said chuck actuator whereby there are substantially no unbalanced forces axially of said chuck during chucking and unchucking movements thereof, and means for applying a primary actuating force transversely of said chuck.

25. In a chuck actuating mechanism, a chuck, a member carrying said chuck, a chuck actuating member, means acting axially of said chuck for moving said actuating member, means connected to said member carrying said chuck and resisting the force transmitted to said chuck actuating member, and means for applying a primary actuating force transversely of said chuck whereby during chucking and unchucking there are substantially no unbalanced forces axially of said chuck.

26. In a chuck actuating mechanism, a chuck, a member carrying said chuck, an actuator for said chuck, a part for moving said actuator axially of said chuck, a part engaged with said member carrying said chuck for resisting the force transmitted to said last mentioned member upon movement of said actuator, and means for moving said parts relatively to each other for moving said actuator axially of said chuck.

27. In a chuck actuating mechanism, a chuck, a member carrying said chuck, an actuator for said chuck, relatively movable members, one coacting with said member carrying said chuck to resist movement in one direction, the other of said members acting upon said chuck actuator in the opposite direction, and means for moving said relatively movable members to cause said chuck actuator to be moved whereby chucking and unchucking forces axially of said chuck are substantially balanced.

28. In a chuck actuating mechanism, a chuck, a member carrying said chuck, a chuck actuator, means for resiliently moving said actuator in one direction, means for moving said actuator in the opposite direction, said last mentioned means being associated with said member carrying said chuck so as to cause the forces acting axially of said chuck during the actuation of said chuck actuator to be confined to a direction substantially axially of said chuck and to be substantially balanced.

29. In a chuck actuating mechanism, a chuck, a member carrying said chuck, a part associated with said chuck carrying member, a second part associated with said chuck actuator, a lever having means for connecting said two parts and moving the same relatively to each other, whereby said chuck actuator may be moved and the force for moving said actuator counterbalanced by said part associated with said member carrying said chuck.

30. In a chuck operating mechanism, a chuck, a member carrying said chuck, a chuck jaw actuator, means for moving said chuck jaw actuator including a pair of relatively movable members, one of which acts against said actuator while the other acts against said member carrying said chuck, and means for moving said relatively movable members relatively to each other for the purpose described.

31. A machine comprising, a base, a plurality of members mounted on said base and each carrying a chuck, and chuck actuating means comprising two relatively movable members mounted independently of said chuck carrying members, said relatively movable members being periodically associated with each of said chuck carrying members and acting in opposite directions along the axis of the chuck carrying member with which said relatively movable members are associated.

32. A machine comprising, a base, a chuck, a member carrying said chuck and mounted on said base, an actuator for said chuck, a part for moving said actuator, a part engaging with said chuck carrying member for resisting the force transmitted to said member upon movement of the chuck, and means for moving said parts relatively to each other to actuate said chuck without developing any substantial axial forces between said base and said chuck carrying member.

33. In a chuck actuating mechanism, a chuck, a member carrying said chuck, an actuator for said chuck, a part for moving said actuator, a part engaging with said chuck carrying member for resisting the force transmitted to said member upon movement of the chuck, and means for moving said parts relatively to each other to actuate said chuck so that one of said parts will be the sole means for counterbalancing all axial forces transmitted to said chuck carrying member by the other of said parts.

34. A machine comprising, a base, a spindle rotatably mounted in bearings in said base, a chuck mounted on said spindle, an actuator for said chuck, a part coacting with said actuator, a part coacting with said spindle for resisting the force transmitted to said spindle upon movement of the chuck, and means for moving said parts relatively to each other so that the actuation of said chuck will develop no substantial axial forces between said spindle and said base.

35. In a chucking device, chuck mechanism including two parts movable relatively to each other to effect the opening and closing of the chuck, a pusher and a puller for actuating said chuck parts relatively to each other, said pusher device being associated with one chuck part and said puller device being associated with the other chuck part, and means for moving said pusher and puller relatively to each other for moving said chuck parts for the purpose described.

36. In a chucking device, chuck mechanism including two parts movable relatively to each other to effect the opening and closing of the chuck, spring means for urging said chuck parts in one direction relatively to each other, a pair of relatively movable members for urging said chuck parts in the other direction against the force of the spring, one of said members being associated with one chuck part and the other of said members being associated with the other of said chuck parts, and means for moving said relatively movable members relatively to each other for the purpose described.

37. In a chucking device, chuck mechanism including two parts movable relatively to each other to effect the opening and closing of the chuck, means supported independently of said chuck parts and comprising two relatively movable members, one of said members being engageable with one of said chuck parts and the other of said members being engageable with the other of said chuck parts, and means for moving said two members relatively to each other for the purpose described.

38. In a chucking device, chuck mechanism including two parts movable relatively to each other to effect the opening and closing of the chuck, means supported independently of said chuck parts and comprising two relatively movable members, one of said members being engageable with one of said chuck parts and the other of said members being engageable with the other of said chuck parts, means for moving said two members relatively to each other for the purpose described, and means for applying an actuating force transversely of the direction of relative movement between said members for moving said members for the purpose described.

39. In a chucking device, a member carrying a chuck, and a unitary pre-stressed spring device to be applied as a unit for actuating said chuck.

40. In a chucking device, a member carrying a chuck, a spring, means for holding said spring under stress, and means for coupling said stressed spring to said chuck for actuating the latter, said springs and said means for holding the same under stress being unitarily assembled and applicable as a unit.

41. In a chucking device, a spindle, chuck means at the forward end of said spindle, a spring, means for holding said spring under initial stress, said spring and means for holding the same under initial stress being insertible into said spindle from one end as a unit with said spring under initial stress, and means for coupling said chuck means and spring together whereby said spring may actuate said chuck means in one direction, and means at the rear of said spindle for actuating said chuck means in the opposite direction and against said spring.

42. In a machine of the character indicated, an indexible member carrying a plurality of chucks, each chuck comprising two parts movable relatively to each other to effect the opening and closing of the chuck, a chuck actuator comprising two relatively movable parts and positioned to be coupled to the parts of said chucks successively in one position thereof, and means for moving said chuck actuator parts relatively to each other to effect movement of said chuck parts, said chuck actuator parts having coupling means to said chuck parts to apply actuating forces to the latter substantially axially thereof for the purpose described.

43. In a machine of the character indicated, an indexible member carrying a plurality of chucks, each chuck comprising two parts movable relatively to each other to effect the opening and closing of the chuck, a chuck actuator comprising two relatively movable parts and positioned to be coupled to the parts of said chucks successively in one position thereof, and means for moving said chuck actuator parts relatively to each other to effect movement of said chuck parts, one of said parts to be coupled to the other comprising a yoke to engage its coupled part at opposite sides so as to avoid unbalanced or twisting forces.

ROBERT S. BROWN.